United States Patent
Zhuang et al.

(10) Patent No.: US 11,768,888 B2
(45) Date of Patent: Sep. 26, 2023

(54) ATTRIBUTE EXTRACTION

(71) Applicant: Pinterest, Inc., San Francisco, CA (US)

(72) Inventors: Jinfeng Zhuang, Seattle, WA (US); Zhengda Zhao, San Francisco, CA (US); Vijai Mohan, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 76 days.

(21) Appl. No.: 17/400,037

(22) Filed: Aug. 11, 2021

(65) Prior Publication Data
US 2022/0327168 A1    Oct. 13, 2022

Related U.S. Application Data (60) Provisional application No. 63/173,299, filed on Apr. 9, 2021.

(51) Int. Cl.
| | | |
|---|---|---|
| *G06F 16/00* | (2019.01) | |
| *G06F 16/951* | (2019.01) | |
| *G06N 3/08* | (2023.01) | |
| *G06F 18/214* | (2023.01) | |

(52) U.S. Cl.
CPC .......... *G06F 16/951* (2019.01); *G06F 18/214* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 2013/0073514 A1* | 3/2013 | Cai | G06F 16/951 |
| | | | 707/E17.022 |
| 2021/0157554 A1* | 5/2021 | Minasyan | G06F 16/285 |
| 2021/0271494 A1* | 9/2021 | Rosenbaum | G06N 20/00 |
| 2022/0100714 A1* | 3/2022 | Zhao | G06N 3/048 |

OTHER PUBLICATIONS

Arora, S., et al., "Contextual Embeddings: When Are They Worth It?," In Proceedings of the 58th Annual Meeting of the Association for Computational Linguistics, pp. 2650-2663, Jul. 5-10, 2020, Association for Computational Linguistics (ACL), URL: https://aclanthology.org/2020.acl-main.236.pdf.

Baumgartner, R., et al., "Visual Web Information Extraction with Lixto," In Proceedings of the 27th Very Large Databases (VLDB) Conference, Sep. 11-14, 2001, Roma, Italy (2001), URL: https://www.dbai.tuwien.ac.at/staff/baumgart/lixto/vldb.pdf, 10 pages.

(Continued)

*Primary Examiner* — Anhtai V Tran
(74) *Attorney, Agent, or Firm* — Athorus, PLLC (57) ABSTRACT

Disclosed are systems and methods for autonomously extracting attributes from domains of a vertical. The disclosed implementations train a deep neural network ("DNN") based on one or more domains of a vertical using labeled embedding vectors generated for nodes of those one or more domains. The trained DNN may then be used to autonomously label nodes of other domains within the same vertical such that attributes corresponding to those labels can be extracted.

19 Claims, 7 Drawing Sheets

(56) References Cited

OTHER PUBLICATIONS

Bin Mohd Azir, M. A. and K. B. Ahmad, "Wrapper Approaches for Web Data Extraction: A Review," In 2017 6th International Conference on Electrical Engineering and Informatics (ICEEI), 2017, pp. 1-6, doi: 10.1109/ICEEI.2017.8312458.

Bingham, E. and H. Mannila, "Random Projection in Dimensionality Reduction: Applications to Image and Text Data," In 2001 7th ACM SIGKDD Conference on Knowledge Discovery and Data Mining (KDD), San Francisco, CA, USA. 245-250, URL: http://users.ics.aalto.fi/ella/publications/randproj_kdd.pdf.

Cho, K., et al., "Learning Phrase Representations using RNN Encoder-Decoder for Statistical Machine Translation," In Proceedings of the 2014 Conference on Empirical Methods in Natural Language Processing (EMNLP), pp. 1724-1734, Oct. 25-29, 2014, Doha, Qatar, Association for Computational Linguistics (ACL), URL: https://aclanthology.org/D14-1179.pdf.

Crescenzi, V., et al., "Roadrunner: Towards Automatic Data Extraction from Large Web Sites," In Proceedings of the 27th Very Large Databases (VLDB) Conference, Sep. 11-14, 2001, pp. 109-118, Roma, Italy (2001), URL: http://vldb.org/conf/2001/P109.pdf.

Dalvi, N., et al., "Automatic Wrappers for Large Scale Web Extraction," In the 37th International Conference on Very Large Data Bases, Aug. 29-Sep. 3, 2011, Proceedings of the VLDB Endowment (PVLDB), vol. 4, No. 4, pp. 219-230, arXiv preprint arXiv:1103.2406 (2011), URL: https://arxiv.org/ftp/arxiv/papers/1103/1103.2406.pdf.

Dalvi, N., et al., "Robust Web Extraction: An Approach Based on A Probabilistic Tree-Edit Model," In Proceedings of AMC SIGMOD International Conference on Management Data, Jun. 29-Jul. 2, 2009, pp. 335-348, Providence, Rhode Island, USA, Association for Computing Machinery (ACM), URL: https://citeseerx.ist.psu.edu/viewdoc/download?doi=10.1.1.187.7378&rep=rep1&type=pdf.

Devlin, J., et al., "BERT: Pre-training of Deep Bidirectional Transformers for Language Understanding," In the 17th Annual Conference of the North American Chapter of the Association for Computational Linguistics: Human Language Technologies (NAACL-HLT), Jun. 2-Jun. 7, 2019, pp. 4171-4186, Minneapolis, Minnesota, Association for Computational Linguistics, URL: https://aclanthology.org/N19-1423.pdf.

Dong, X. L., et al., "Multi-modal Information Extraction from Text, Semi-structured, and Tabular Data on the Web," In Proceedings of the 58th Annual Meeting of the Association for Computational Linguistics, Jul. 5, 2020, pp. 23-26, 2020.

Ferrara, E., et al., "Web Data Extraction, Applications and Techniques: A Survey," Knowledge-Based Systems, 2014, pp. 301-323, vol. 70.

Flesca, S., et al., "Web Wrapper Induction: A Brief Survey," AI Communications 17, 2 (2004), pp. 57-61, URL: https://www.researchgate.net/publication/220308841_Web_wrapper_induction_A_brief_survey.

Gentile, A. L., et al., "Web Scale Information Extraction with LODIE," In Semantics for Big Data, Association for the Advancement of Artificial Intelligence (AAAI) Technical Report FS-13-04, 2013, pp. 24-27, AAAI, URL: https://www.aaai.org/ocs/index.php/FSS/FSS13/paper/view/7577/7547.

Gulhane, P., et al., "Web-Scale Information Extraction with Vertex," In Proceedings of the IEEE 27th International Conference on Data Engineering (ICDE), Apr. 2011, pp. 1209-1220, URL: https://www.researchgate.net/profile/Pankaj-Gulhane-2/publication/220966364_Web-scale_information_extraction_with_vertex/links/0c96052281b91edf58000000/Web-scale-information-extraction-with-vertex.pdf.

Gunawan, R., et al., "Comparison of Web Scraping Techniques: Regular Expression, HTML DOM and Xpath," In Proceedings of the 2018 International Conference on Industrial Enterprise and System Engineering (ICoIESE 2018), 2019, pp. 283-287, Atlantis Highlights in Engineering (AHE), vol. 2, Atlantis Press, URL: https://www.atlantis-press.com/proceedings/icoiese-18/55914830.

Hamilton, W. L., et al., Inductive Representation Learning on Large Graphs. In the 31st Conference on Neural Information Processing Systems (NIPS 2017), pp. 1024-1034, Long Beach, CA, USA, URL: https://proceedings.neurips.cc/paper/2017/file/5dd9db5e033da9c6fb5ba83c7a7ebea9-Paper.pdf.

Hao, Q., et al., "From One Tree to a Forest: a Unified Solution For Structured Web Data Extraction," In Proceedings of the 34th International ACM SIGIR Conference on Research and Development in Information Retrieval (SigIR), Jul. 24-28, 2011, pp. 775-784, Beijing, China, URL: https://www.microsoft.com/en-us/research/wp-content/uploads/2016/02/StructedDataExtraction_SIGIR2011.pdf.

Hochreiter, S. and Schmidhuber, J., "Long Short-Term Memory," Neural Computation, vol. 9, No. 8, pp. 1735-1780, 1997, https://www.researchgate.net/profile/Sepp_Hochreiter/publication/13853244_Long_Short-term_Memory/links/5700e75608aea6b7746a0624/Long-Short-term-Memory.pdf?origin=publication_detail, 33 pages.

Kim, Y., 2014, Convolutional Neural Networks for Sentence Classification. In Proceedings of the 2014 Conference on Empirical Methods in Natural Language Processing, pp. 1746-1751, Retrieved: http://emnlp2014.org/papers/pdf/EMNLP2014181.pdf, 6 pages.

Kipf, T.N. and Welling, M., "Semi-Supervised Classification with Graph Convolutional Networks," ICLR, 2017, 14 pages.

Kocayusufoglu, F., et al., "RiSER: Learning Better Representations for Richly Structured Emails," In Proceedings of the 2019 International World Wide Web Conference (WWW 2019), May 13-17, 2019, pp. 886-895, San Francisco, CA, USA, Creative Commons CC-BY-NC-ND 4.0 License, URL: https://storage googleapis.com/pub-tools-public-publication-data/pdf/3d97b8409acf2f19629f22dff5252e8b566d54e0.pdf.

Kouzis-Loukas, D., "Learning Scrapy," Packt Publishing Ltd., 2016, 270 pages, Birmingham-Mumbai, URL: https://profs.info.uaic.ro/~avitcu/Kouzis-Loukas%20Dimitrios.-Learning%20Scrapy_%20Learn%20the%20art%20of%20eficient%20web%20scraping%20and%20crawling%20with%20Python.pdf.

Kushmerick, N., "Wrapper Induction: Efficiency and Expressiveness," Artificial Intelligence 118, 1-2 (2000), pp. 15-68, URL: https://www.sciencedirect.com/science/article/pii/S0004370299001009.

Kushmerick, N., et al., "Wrapper Induction for Information Extraction," CiteSeerX, 1997, 7 pages, URL: http://citeseerx.ist.psu.edu/viewdoc/download;jsessionid=A6E5D2F34A21E2002BECB4E1B253E9AD?doi=10.1.1.49.9663&rep=rep1&type=pdf.

Li, J., et al., "A Survey on Deep Learning for Named Entity Recognition," IEEE Transactions on Knowledge and Data Engineering (TKDE 2020), Mar. 18, 2020, URL: https://www.researchgate.net/publication/339990379_A_Survey_on_Deep_Learning_for_Named_Entity_Recognition.

Lin, B. Y., et al., "AlpacaTag: An Active Learning-based Crowd Annotation Framework for Sequence Tagging," In Proceedings of the 57th Annual Meeting of the Association for Computational Linguistics: System Demonstrations (ACL), Jul. 28-Aug. 2, 2019, 58-63, URL: https://aclanthology.org/P19-3010.pdf.

Lin, B. Y., et al., "FreeDOM: A Transferable Neural Architecture for Structured Information Extraction on Web Documents," In Knowledge Discovery in Databases (KDD), Aug. 23-27, 2020, Virtual Conference, CA, USA, Association for Computing Machinery (ACM), 1092-1102, URL: https://dl.acm.org/doi/pdf/10.1145/3394486.3403153.

Lin, B. Y., et al., "KagNet: Knowledge-Aware Graph Networks for Commonsense Reasoning," In Proceedings of the 2019 Conference on Empirical Methods in Natural Language Processing and the 9th International Joint Conference on Natural Language Processing (EMNLPIJCNLP), Nov. 3-7, 2019, pp. 2829-2839, Hong Kong, China, Association for Computational Linguistics, URL: https://aclanthology.org/D19-1282.pdf.

Liu, D., et al., "Research on Adaptive Wrapper in Deep Web Data Extraction," In 2015 Proceedings of the Second International Conference on Internet of Vehicles (IOV), Safe and Intelligent Mobility, vol. 9502. 409-423, Springer International Publishing, Switzerland 2015.

(56) References Cited

OTHER PUBLICATIONS

Lockard, C., et al., "CERES: Distantly Supervised Relation Extraction from the Semi-Structured Web," In Proceedings of the Very Large Data Bases (VLDB) Endowment, vol. 11, No. 10 (2018), 1084-1096, URL: http://www.vldb.org/pvldb/vol11/p1084-lockard.pdf.

Lockard, C., et al., "ZeroShotCeres: Zero-Shot Relation Extraction from Semi-Structured Webpages," In Proceedings of the 58th Annual Meeting of the Association for Computational Linguistics (ACL), Jul. 5-10, 2020, 8105-8117, URL: https://aclanthology.org/2020.acl-main.721.pdf.

Martinez-Rodriguez, J. L., et al., "Information Extraction Meets the Semantic Web: A Survey," 2016, Semantic Web Preprint 2020, vol. 11, No. 2, pp. 255-335, 1-81, URL: http://www.semantic-web-journal.net/system/files/swj1744.pdf.

Melnik, S., et al., "Dremel: Interactive Analysis of Web-Scale Datasets, "Communications of the ACM, vol. 54, No. 6, Jun. 2011, 114-123, URL: https://storage.googleapis.com/pub-tools-public-publication-data/pdf/37217.pdf.

Naitzat, G., et al., "Topology of Deep Neural Networks," Journal of Machine Learning Research 21, 184 (2020), 1-40, URL: https://www.jmlr.org/papers/volume21/20-345/20-345.pdf.

Omari, A., et al., "Synthesis of Forgiving Data Extractors," In Web Search and Data Mining (WSDM), Feb. 6-10, 2017, 385-394, Cambridge, United Kingdom, URL: https://www.tau.ac.il/~sharonshoham/papers/wsdm17.pdf.

Ortona, S., et al., "WADaR: Joint Wrapper and Data Repair," In Proceedings of the Very Large Data Bases (VLDB) Endwoment, vol. 8, No. 12, 1996-1999, Aug. 31-Sep. 14, 2015, Kohala Coast, Hawaii, URL: http://www.vldb.org/pvldb/vol8/p1996-ortona.pdf.

Polleres, A., et al., "Can we ever catch up with the Web?," Semantic Web, vol. 1, No. 1-2 (2010), 45-52, IOS Press, URL: https://aidanhogan.com/docs/swj_pospaper.pdf.

Qian, Y., et al., "GraphIE: A Graph-Based Framework for Information Extraction," arXiv preprint arXiv:1810.13083 (2018), URL: https://arxiv.org/pdf/1810.13083v1.pdf.

Qiu, D., et al., "Big Data Linkage for Product Specification Pages," In SIGMOD/PODS, Jun. 10-15, 2018, Houston, TX, USA, 67-81, Association for Computing Machinery, URL: https://www.cin.ufpe.br/~luciano/pub/big-data-linkage.pdf.

Rasouli, N., et al., "Designing an Agent for Information Extraction from Persian E-shops," Telkomnika, vol. 16, No. 1, Feb. 2018, 455-462, URL: https://www.researchgate.net/publication/346856571_Designing_an_Agent_for_Information_Extraction_from_Persian_E-shops.

Schulz, A., et al., "Practical Web Data Extraction: Are We There Yet?—A Short Survey," In 2016 IEEE/WIC/ACM International Conference on Web Intelligence (ICWI), vol. 1, 562-567.

Shervashidze, N., et al., "Weisfeiler-Lehman Graph Kernels," Journal of Machine Learning Research (JMLR) 12, 9 (2011), 2539-2561, URL: https://www.jmlr.org/papers/volume12/shervashidze11a/shervashidze11a.pdf.

Sleiman, H. A. and R. Corchuelo, "A Survey on Region Extractors from Web Documents," In IEEE Transactions on Knowledge and Data Engineering (TKDE), vol. 25, No. 9, Sep. 2013, 1960-1981, URL: https://romisatriawahono.net/lecture/rm/survey/information%20retrieval/Sleiman%20-%20Region%20Extractors%20from%20Web%20Documents%20-%202013.pdf.

Talmor, A. and J. Berant, "The Web as a Knowledge-base for Answering Complex Questions," In Proceedings of NAACL-HLT 2018, 641-651, New Orleans, Louisiana, Jun. 1-6, 2018, Association for Computational Linguistics, URL: https://aclanthology.org/N18-1059.pdf.

Thomas, A. and S. Sangeetha, "Deep Learning Architectures for Named Entity Recognition: A Survey," In Advanced Computing and Intelligent Engineering, Proceedings of ICACIE 2018, vol. 1, Springer, 215-225, URL: http://eprints.kmu.ac.ir/30207/8/SPRINGER%20book-compressed.pdf#page=217.

Wójcik, P. I. and M. Kurdziel, "Training Neural Networks on High-Dimensional Data Using Random Projection," Pattern Analysis and Applications 22, 3 (2019), 1221-1231, URL: https://link.springer.com/content/pdf/10.1007/s10044-018-0697-0.pdf.

Xu, K., et al., "How Powerful are Graph Neural Networks?," In ICLR, Feb. 22, 2019, 17 pages, URL: https://arxiv.org/pdf/1810.00826.pdf.

Zhou, Y., et al., "Simplified DOM Trees for Transferable Attribute Extraction from the Web," International World Wide Web (WWW) Conference Committee, Apr. 19-23, 2021, Ljubljana, Slovenia, Jan. 7, 2021, 10 pages, arXiv:2101.02415, URL: https://arxiv.org/pdf/2101.02415.pdf.

Zhuang, Y., et al., "An Active Learning Based Hybrid Neural Network for Joint Information Extraction," In International Conference on Web Information Systems Engineering, Springer, 2020, pp. 84-100.

\* cited by examiner

ATTRIBUTE EXTRACTION

PRIORITY CLAIM

This application claims priority to U.S. Provisional Patent Application No. 63/173,299, filed Apr. 9, 2021, and titled "Pinpoint: A Neural Inductive Attribute Extractor For Web Pages," the contents of which are herein incorporated by reference in their entirety.

BACKGROUND

Despite the explosive growth of the worldwide web over the past couple of decades, much of the digitized knowledge has been curated for human understanding and has stayed unfriendly for machine comprehension. Even promising efforts towards creating semantic web like the Resource Description Framework in Attributes (RDFA), Ontology Web Language (OWL), JSON-LD, and Open Graph Protocol are in infancy and fall short for commercial applications due to data sparsity and high variance in data quality across websites. Hence, Web Information Extraction (WIE) colloquially known as scraping is the dominant knowledge acquisition strategy for several organizations in advertising, banking, commerce, entertainment, finance, health, search engines, software testing, travel, etc.

However, existing techniques require extensive time and input from humans, are inconsistent, and specific to each domain for which extraction is to occur. In addition, existing efforts to extract attribute data from a domain are notorious for undetectable failures due to temporal changes and partial matching of the data to be extracted.

DETAILED DESCRIPTION

Disclosed are systems and methods for autonomously extracting attributes from domains of a vertical. Unlike traditional systems that require weeks of manual labeling of pages of a domain and/or generation of rules that are used to extract attributes from a domain, the disclosed implementations train a deep neural network ("DNN") based on one or more domains of a vertical using labeled embedding vectors generated for nodes of those one or more domains. The trained DNN may then be used to autonomously label nodes of other domains within the same vertical such that attributes corresponding to those labels can be extracted. The disclosed technological improvements increase the accuracy and robustness of attribute extraction from domains and also decrease the time required to extract attributes from a domain.

As discussed further below, the disclosed implementations learn a function that embeds all the Document Object Model ("DOM") nodes of a domain webpage in a metric space, which preserves semantic information, structural relationship to other nodes within a page and node identity across webpages of the domain. For example, each node's local information such as Hypertext Markup Language ("HTML") tags, attributes, node text, and handcrafted domain-specific features may be encoded into embedding vectors. In addition, the hierarchical DOM structure (a tree) may be used to enhance each node embedding vector based on, for example, node neighbors. Some or all of the node embedding vectors may then be labeled to produce labeled training data for the domain and used to train a DNN for the vertical with which the domain is associated.

In some implementations, as discussed below with respect to FIG. 2, nodes from pages of a first domain of a vertical may be manually labeled to generate labeled training data to train the DNN for that vertical. In contrast to existing systems, which require manual labeling and rules for each domain, once the DNN is trained for a vertical, that DNN may be used to autonomously label nodes from pages of other domains of that vertical so that attributes for those labels can be accurately extracted from pages of those other domains. Such autonomous labeling and attribute extraction may be done without the DNN ever seeing or being exposed to the other domains of the vertical. In addition, because the attributes are identified and extracted in accordance with the disclosed implementations, the extraction is robust to changes to the attributes and/or configuration of the pages of the other domains. Accordingly, the disclosed implementations provide a technical improvement over existing solutions through attribute extraction for any number of domains of a vertical without first having to train or define specific rules for each individual domain. In addition, as discussed further below, the disclosed implementations increase the robustness of attribute extraction compared to existing techniques.

Figure 1:
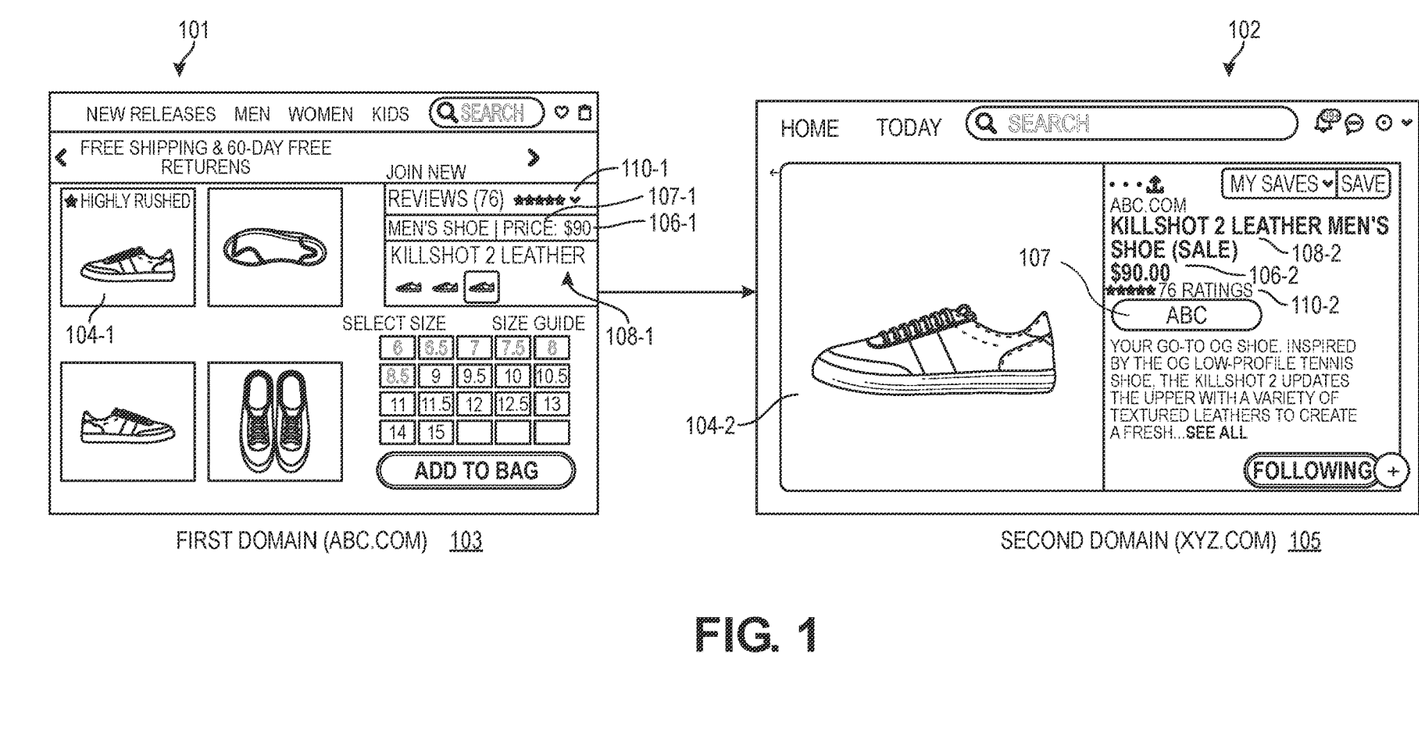
FIG. 1 is an example illustration of extraction of attributes from a first page of a first domain and generation of a second page on a second domain that includes some or all of those extracted attributes, in accordance with disclosed implementations.

FIG. 1 is an example illustration of extraction of attributes from a first page 101 of a first domain 103 of a vertical and generation of a second page 102 on a second domain 105 that includes some or all of those extracted attributes, in accordance with disclosed implementations.

A domain, as used herein, refers to a group or collection of objects, such as webpages. In one example, a domain refers to a domain name within a networking scheme, such as the Internet, that defines or includes one or more objects, such as webpages. As used herein, a vertical refers to a category or type for a group of one more domains. For example, one vertical for a group of domains may be a shopping vertical in which all domains included in the shopping vertical relate to shopping. Another vertical may be travel and all domains included in the vertical travel relate to travel. Any number and type of vertical that includes any number of domains may be utilized with the disclosed implementations. Other examples of verticals include, but are not limited to a recipe vertical, a media vertical (e.g., movies, music, etc.), a services vertical, etc. Attributes include, but are not limited to titles, images, descriptions, prices, colors, sizes, reviews, ratings, origins, destinations, etc.

As illustrated in FIG. 1, attributes of the first page 101 of a first domain 103, which is in the shopping vertical, include, but are not limited to, an image 104-1, in this example an image of a shoe, a price 106-1, in this example a price of $90 for the shoe represented in the image, the word "price:" 107-1 (which precedes the price of $90), a title 108-1, in this example "Killshot 2 Leather Men's Shoe (Sale)," and reviews/ratings 110-1, in this example "REVIEWS (76)" and five stars. As will be appreciated, other information presented on a page may also be examples of attributes of the page.

As discussed further below, the disclosed implementations may identify and extract attributes from a page, such as the first page 101, of a domain, such as the first domain 103. Extracted attributes may be used for a variety of purposes. In one example, extracted attributes may be included on or used to create a second page 102 on a second domain 105. In the illustrated example, the attributes of image 104-1, price 106-1, title 108-1, and rating 110-1 are extracted from the first page 101 of the first domain 103 and included on a second page 102 of a second domain 105 as attributes of image 104-2, price 106-2, title 108-2, and rating 110-2.

The second domain 105 may be in the same or different vertical than the first domain. In the illustrated example, as noted above, the first domain may be a shopping vertical. In comparison, the second domain may be a social networking vertical. For example, the second page 102 may be created to promote the item (in this example a shoe) and the first domain through the second domain 105. In this example, a user browsing information on the second domain 105 may by presented with the second page, which includes accurate attributes about the item that were extracted from the first page 101 of the first domain 103. If the user is interested in the item, the user may select the control button 107 and receive additional information about the item, purchase the item, and/or be directed to the first page 101 of the first domain 103 from which the attributes were extracted.

While the above example illustrates the creation of a second page 102 on a second domain 105 based on attributes extracted from the first page 101 of the first domain 103, the attributes extracted in accordance with the disclosed implementations may be used for a variety of purposes beyond generation of a page. For example, extracted attributes may be used to update a catalog or datastore that includes information relating to the first domain, to categorize products into a taxonomy, to enhance or build search engines, as part of a search system, etc.

Figure 2:
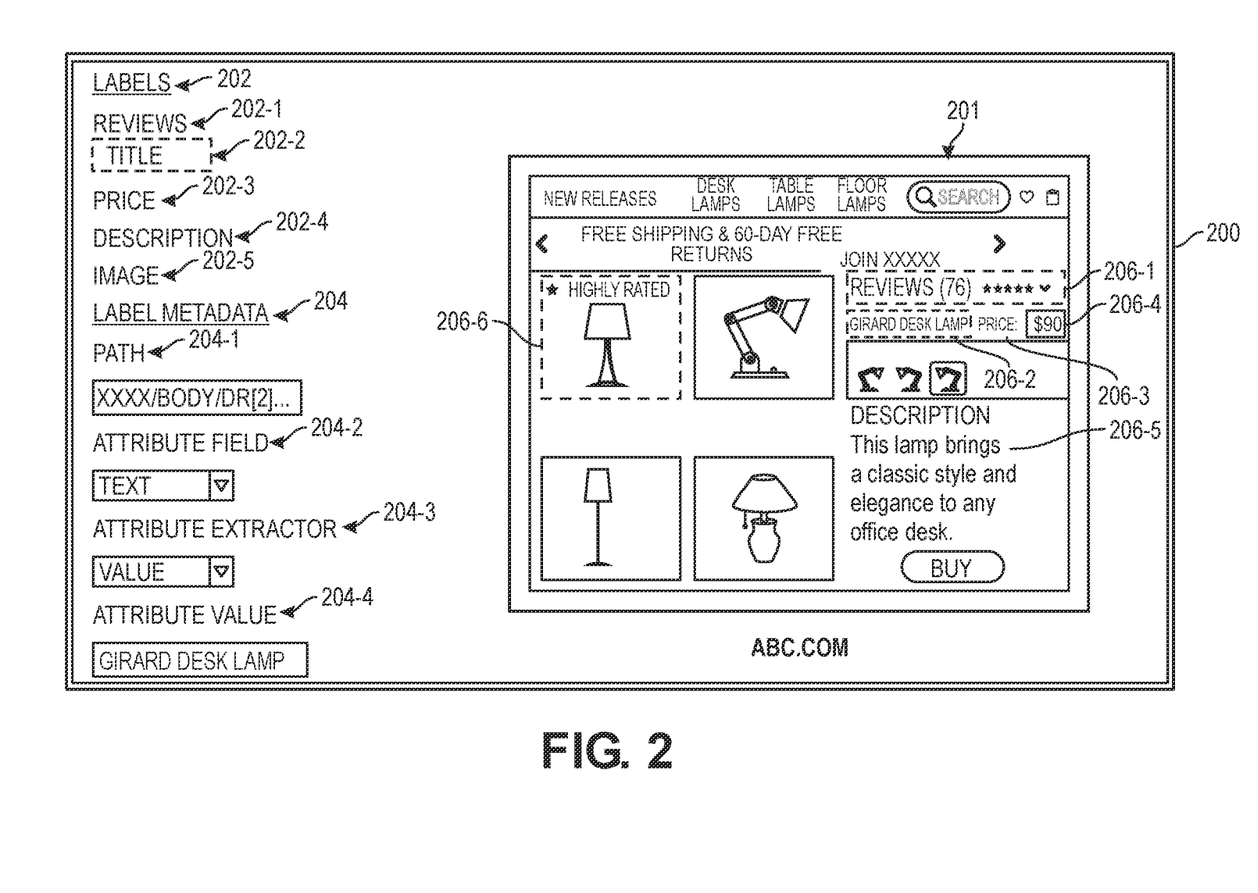
FIG. 2 is an example illustration of a labeling interface to label nodes of a page from a domain, in accordance with disclosed implementations.

FIG. 2 is an example illustration of a labeling interface 200 to label nodes/attributes of a page from a domain, in accordance with disclosed implementations.

As discussed, to train a DNN for a vertical, page(s) from a domain within that vertical may be labeled and used as labeled training data to train the DNN. The labeling interface 200 is one example interface to facilitate labeling of nodes. As illustrated, a set of labels 202 may be defined for the vertical and presented as part of the labeling interface. In the illustrated example, which relates to the shopping vertical, the labeling interface may include labels 202 such a reviews label 202-1, a title label 202-2, a price label 202-3, a description label 202-4, and an image label 202-5.

A user interacting with the labeling interface 200 may load a page 201 into the labeling interface. The labeling interface may parse the HTML code within the page to determine nodes of the page. As is known, a node is an element of a page and includes information, such as HTML tags, attributes, node text, etc. The labeling interface may process the HTML of the page to identify the nodes of the page and the information of those nodes, such as the attributes presented visually on the page 201. Likewise, in some examples, the node interface 201 may present visual indicators corresponding to each node determined for the page. In this example, nodes of the page 201 include, but are not limited to, a first node 206-1 that includes presented attributes of "Reviews (76)" and five stars, a second node 206-2 with presented attributes of "Girard Desk Lamp," a third node 206-3 with presented attributes of "PRICE:" a fourth node 206-4 with presented attributes of "$90," a fifth node 206-5 with presented attributes of "DESCRIPTION: This lamp brings a classic style and elegance to any office desk," and a sixth node 206-6 with presented attributes of an image of a desk lamp. Other nodes may also exist for the page 201.

The user, through interaction with the labeling interface, such as through operation of a mouse, keyboard, touchscreen, etc., may select nodes of the page and assign a label 202 to the selected node, thereby labeling the node. In the illustrated example, a user has selected the node 206-2 that corresponds to the presented attribute "Girard Desk Lamp" and selected that the label for that node is "Title" 202-2.

When a user selects a node for which a label is to be assigned, the labeling interface may determine the metadata 204 corresponding to the selected node and present some or all of the metadata through the labeling interface. In this example, the presented metadata includes a node path 204-1, such as the HTML path, an attribute field 204-2, which in this example is "text," an attribute extractor 204-3, which in this example is "value", and an attribute value 204-4 (the presented attribute), which in this example is "Girard Desk Lamp." Other examples of attribute fields may include, but are not limited to Cascading Style Sheets ("CSS"), etc.

A user interacting with the labeling interface 200 may quickly go through a loaded page and assign different labels 202 to different nodes of the page, thereby creating labeled data from the page. In some examples, a user may label multiple pages of a domain so that those labels may be used as labeled data from the domain to train a DNN for the vertical in which the domain is included.

Figure 3:
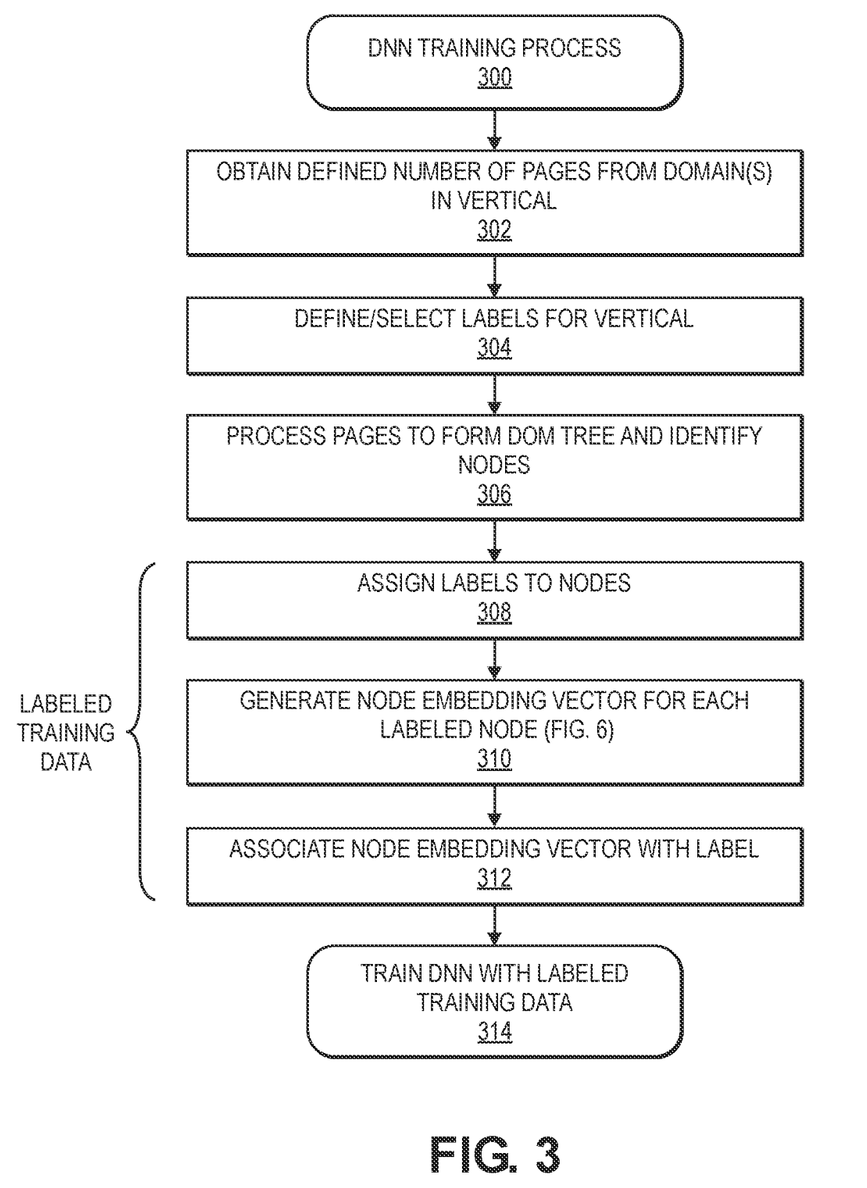
FIG. 3 is an example deep neural network training process, in accordance with disclosed implementations.

FIG. 3 is an example DNN training process 300, in accordance with disclosed implementations.

The example process 300 begins by obtaining a defined number of pages from a domain within a vertical, as in 302. While the disclosed implementations may utilize pages from a single domain of a vertical, in some examples, multiple pages from a subset of domains with a vertical (e.g., 2-3 domains) may be utilized to generate labeled training data.

In addition, for the vertical, a set of labels may be defined or selected, as in 304. Any of a variety of techniques may be used to define or select labels for a vertical. For example, existing knowledge of domains and nodes typically present on a page of domains within the vertical may be utilized to define or select labels for the vertical. For example, if the vertical is shopping, typical labels may include, but are not limited to, title, price, description, reviews, images, etc., as these types of information are present on pages of most shopping domains.

For the pages obtained at block 302, the pages are processed to form a document object model ("DOM") of the page and to identify nodes within that DOM, 306. Forming a DOM tree and node identification of pages is known in the art and need not be discussed in detail herein. For example, systems such as Saxon, lxml, Beautiful Soup, etc., may be utilized to process the pages to form a DOM tree of the page and to identify nodes of the DOM tree.

Labels may then be assigned to nodes of the page, as in 308. For example, utilizing the labeling interface 200 (FIG. 2) discussed above, user(s) may load pages obtained in block 302 and assign labels to different nodes of those pages.

A node embedding vector for each labeled node may then be generated, as in 310. Generating a node embedding vector is discussed in detail below with respect to FIG. 6. For example and as discussed below, the local information of a node, such as HTML tags, attributes, node text, hand-crafted domain-specific features, etc., may be embedded into embedding vectors. In addition, the hierarchical DOM structure (a tree) may be treated as a graph to enhance the node embedding vector for the node based on node neighbors.

To generate the labeled training data, the labels associated with each node are associated with the node embedding vector generated for the node, as in 312.

Finally, the labeled training data produced from a domain (or subset of domains) within a vertical may then be used to train the DNN, as in 314. For example, the DNN may be trained using supervised learning, as discussed below with respect to FIG. 4

Figure 4:
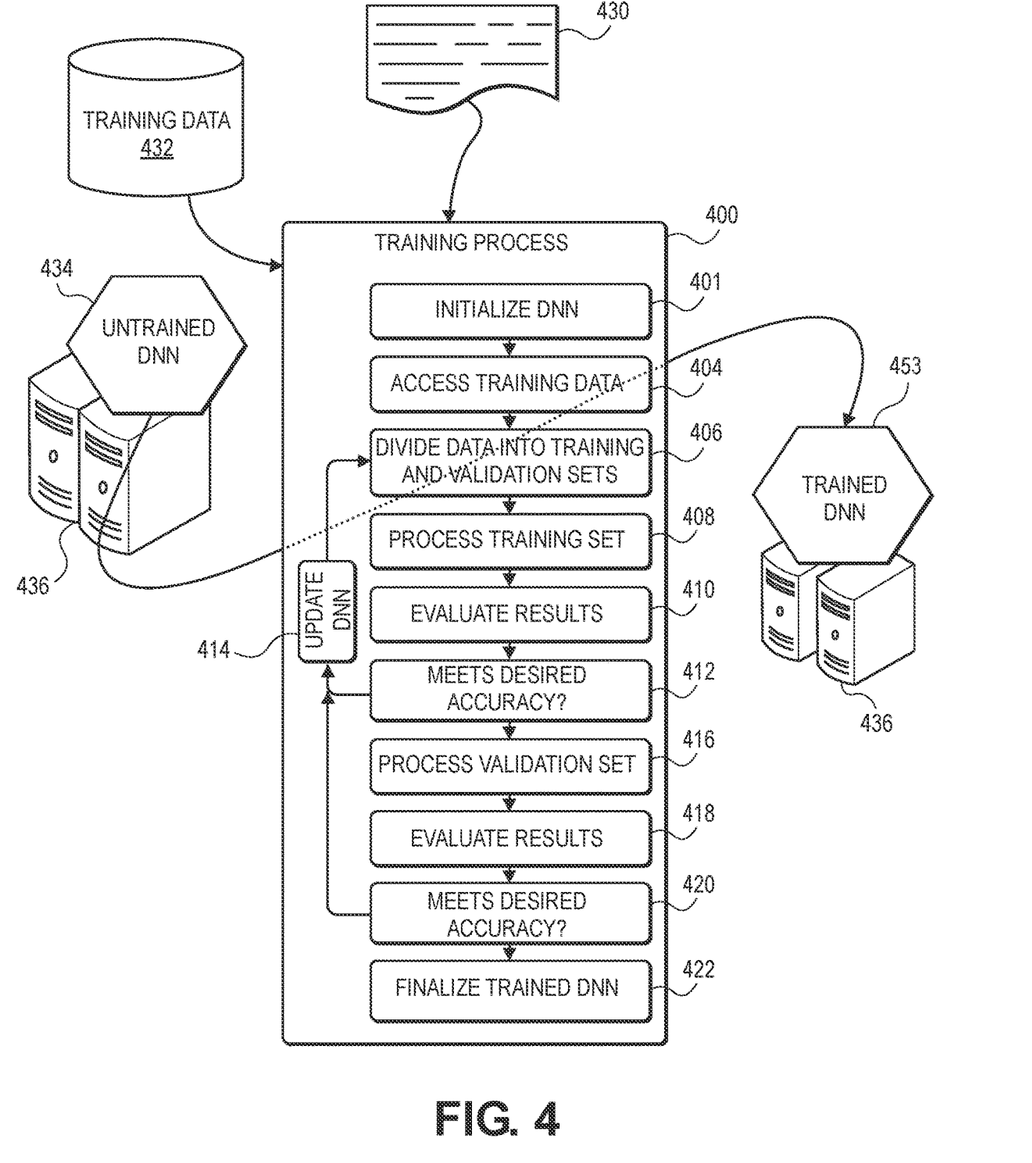
FIG. 4 is an example training process for training a deep neural network, in accordance with disclosed implementations.

FIG. 4 illustrates an exemplary overall process 400 of training a DNN in accordance with aspects of the disclosed subject matter. As shown in FIG. 4, the training process 400 is configured to train an untrained DNN 434 operating on a computer system 436 to transform the untrained DNN into a trained DNN 453 that operates on the same or another computer system, such as a remote computing resource 436. In the course of training, as shown in the training process 400, at step 401, the untrained DNN 434 is initialized with training criteria 430. Training criteria 430 may include, but is not limited to, information as to a type of training, number of layers to be trained, the vertical for which training is to occur, candidate labels, etc.

At step 404 of training process 400, a corpus of labeled training data 432 is accessed. For example, if training is to generate a trained DNN that labels nodes of other domains within a vertical, the training data 432 may include labeled training data from a domain or subset of domains within that vertical, such as labeled training data generated through the labeling interface 200 of FIG. 2.

The disclosed implementations discuss the use of labeled training data, meaning that the actual results of processing of the data items of the corpus of training data (i.e., whether the data corresponds to a positive or negative presence of a condition) are known. Of course, in various implementations, the training data 432 may also or alternatively include unlabeled training data.

With the training data 432 accessed, at step 406 the training data is divided into training and validation sets. Generally speaking, the items of data in the training set are used to train the untrained DNN 434 and the items of data in the validation set are used to validate the training of the DNN. As those skilled in the art will appreciate, and as described below in regard to much of the remainder of training process 400, there are numerous iterations of training and validation that occur during the training of the DNN.

At step 408 of the training process, the data items of the training set are processed, often in an iterative manner. Processing the data items of the training set include capturing the processed results. After processing the items of the training set, at step 410, the aggregated results of processing the training set are evaluated, and at step 412, a determination is made as to whether a desired accuracy level has been achieved. If the desired accuracy level is not achieved, in step 414, aspects of the DNN are updated in an effort to guide the DNN to generate more accurate results, and processing returns to step 406, where a new set of training data is selected, and the process repeats. Alternatively, if the desired accuracy level is achieved, the training process 400 advances to step 416.

At step 416, and much like step 408, the data items of the validation set are processed, and at step 418, the processing accuracy of this validation set is aggregated and evaluated. At step 420, a determination is made as to whether a desired accuracy level, in processing the validation set, has been achieved. If the desired accuracy level is not achieved, in step 414, aspects of the DNN are updated in an effort to guide the DNN to generate more accurate results, and processing returns to step 406. Alternatively, if the desired accuracy level is achieved, the training process 400 advances to step 422.

At step 422, a finalized, trained DNN 453 is generated for the vertical. Typically, though not exclusively, as part of finalizing the now-trained DNN 453, portions of the DNN that are included in the model during training for training purposes are extracted, thereby generating a more efficient trained DNN 453.

Figure 5:
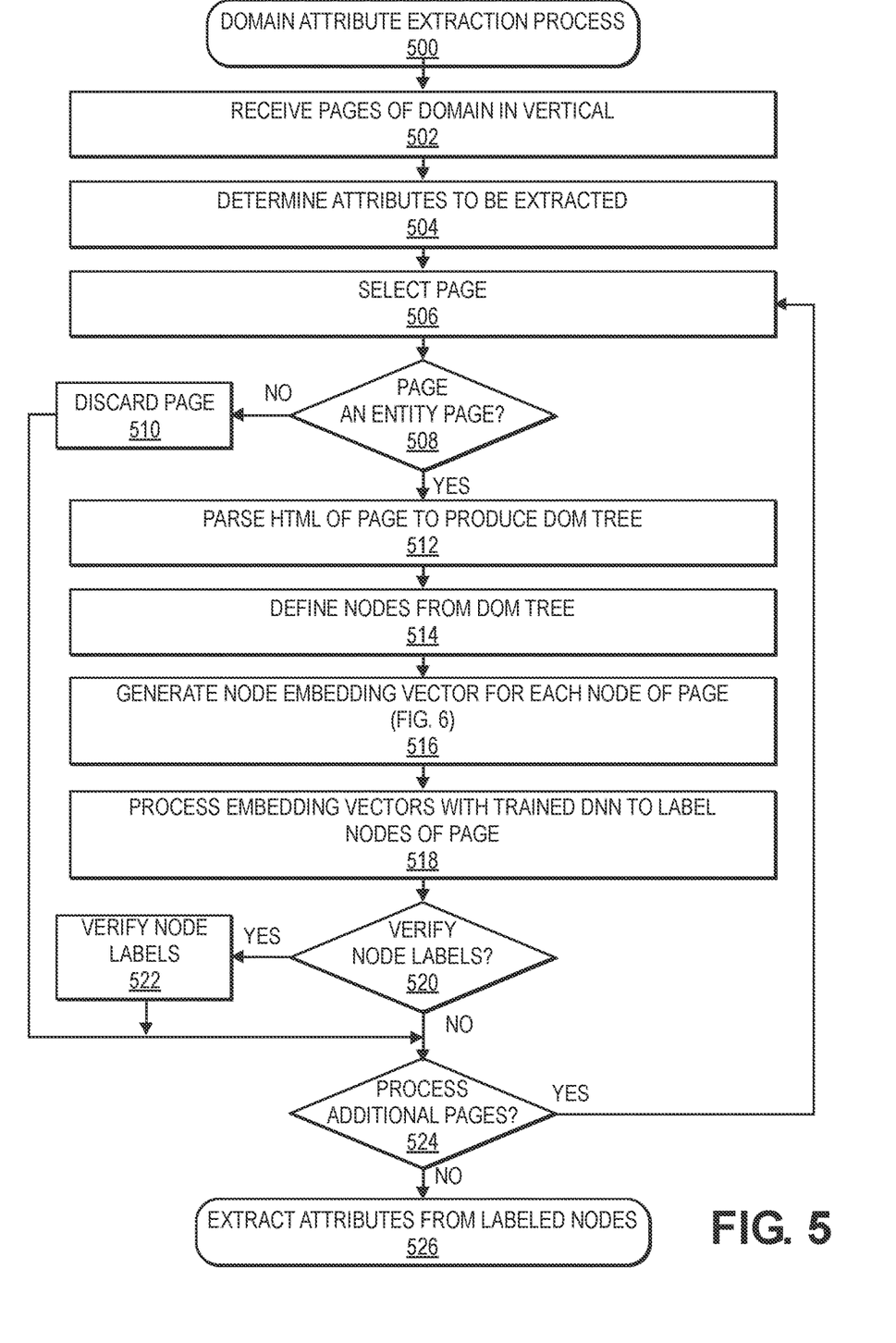
FIG. 5 is an example domain attribute extraction process, in accordance with disclosed implementations.

FIG. 5 is an example domain attribute extraction process 500, in accordance with disclosed implementations.

The example process 500 begins by receiving one or more pages of a domain in a vertical, as in 502. For example, a domain, such as www.abc.com, may be specified and processed to obtain pages of the domain.

A determination may also be made as to the attributes to be extracted from the domain, as in 504. As discussed above, different verticals may have different attributes, each of which may be indicated by a different label. For example and as discussed above, the shopping vertical may have attributes that are labeled image, price, title, description, review, etc. Each of those labels may be used to identify and extract attributes corresponding to those labels.

The example process 500 may then select a page of the domain to process, as in 506. For the selected page, a determination may be made as to whether the page is an entity page, as in 508. As will be appreciated, many domains may have pages that are not relevant for extraction of attributes (e.g., about pages, contact pages). Determination of entity pages may be performed by processing the page for keywords and/or particular HTML structures to determine if sufficient information exists to classify the page as an entity page or a non-entity page. In other implementations, determining whether a page is an entity page may be omitted and all pages of the domain processed by the example process 500. In such an example, the example process 500 may determine that non-entity pages do not include any of the attributes to be labeled, thereby effectively identifying the page as a non-entity page.

If it is determined that the selected page is a non-entity page, the page is discarded from processing as in 510. If it is determined that the selected page is an entity page, or if the determination step 508 is omitted, the HTML of the page may be processed to produce a DOM tree for the page, as in 512, and nodes from the DOM tree are identified, as in 514. As discussed above, processing the HTML of a page to produce a DOM tree and determine nodes of the DOM tree is known in the art and need not be discussed herein.

For each node of the page, a node embedding vector is generated, as in 516. Generating node embedding vectors is discussed further below with respect to FIG. 6. As discussed below, the disclosed implementations learn a function h that embeds all DOM nodes of a page in metric space, which preserves semantic information, structural relationship to other nodes within a page, and node identity across pages.

Each node embedding vector may then be processed by the trained DNN to determine a label corresponding to the node, as in 518. For example, the DNN may be trained to determine, for each node, a probability score for each label upon which the DNN was trained, each probability score indicating a likelihood that the node corresponds to the label. At a high level, the probability score may be based on distance between the node embedding vector of the candidate node of the page and the node embedding vector learned by the DNN for the label. Node embedding vectors that are closer in distance to the node embedding vector learned by the DNN for the label will have a higher probability score than node embedding vectors having a greater distance.

The DNN, or a separate component of the example process 500 may then determine, based on the probability scores for each of the labels upon which the DNN was trained, a label for the node. For example, the label with the highest probability score may be indicated as the label for the node. In some implementations, the probability score must be determined to exceed a threshold before the node is assigned the label. The confidence score may be any defined value, and may vary for different labels, different domains, different verticals, etc.

In some implementations, a determination may be made as to whether some or all of the labeled nodes are to be verified, as in 520. If it is determined that some or all of the labeled nodes are to be verified, the labels for the nodes may be presented to a user or other entity for verification, as in 522. For example, the example process may present a page that has been labeled using the labeling interface discussed above with respect to FIG. 2 and indicate through the interface the label determined for each node. A user may verify or correct the labeling of the different nodes of the page.

After discarding a non-entity page at block 510, verifying labels of a page at block 522, or if it is determined at decision block 520 that the nodes are not to be verified, a determination is made as to whether additional pages of the domain are to be processed, as in 524. If it is determined that additional pages of the domain are to be processed, the example process 500 returns to block 506 and continues. If it is determined that no additional pages are to be processed, attributes from the labeled nodes are extracted from the domain and the example process 500 completes, as in 526.

Figure 6:
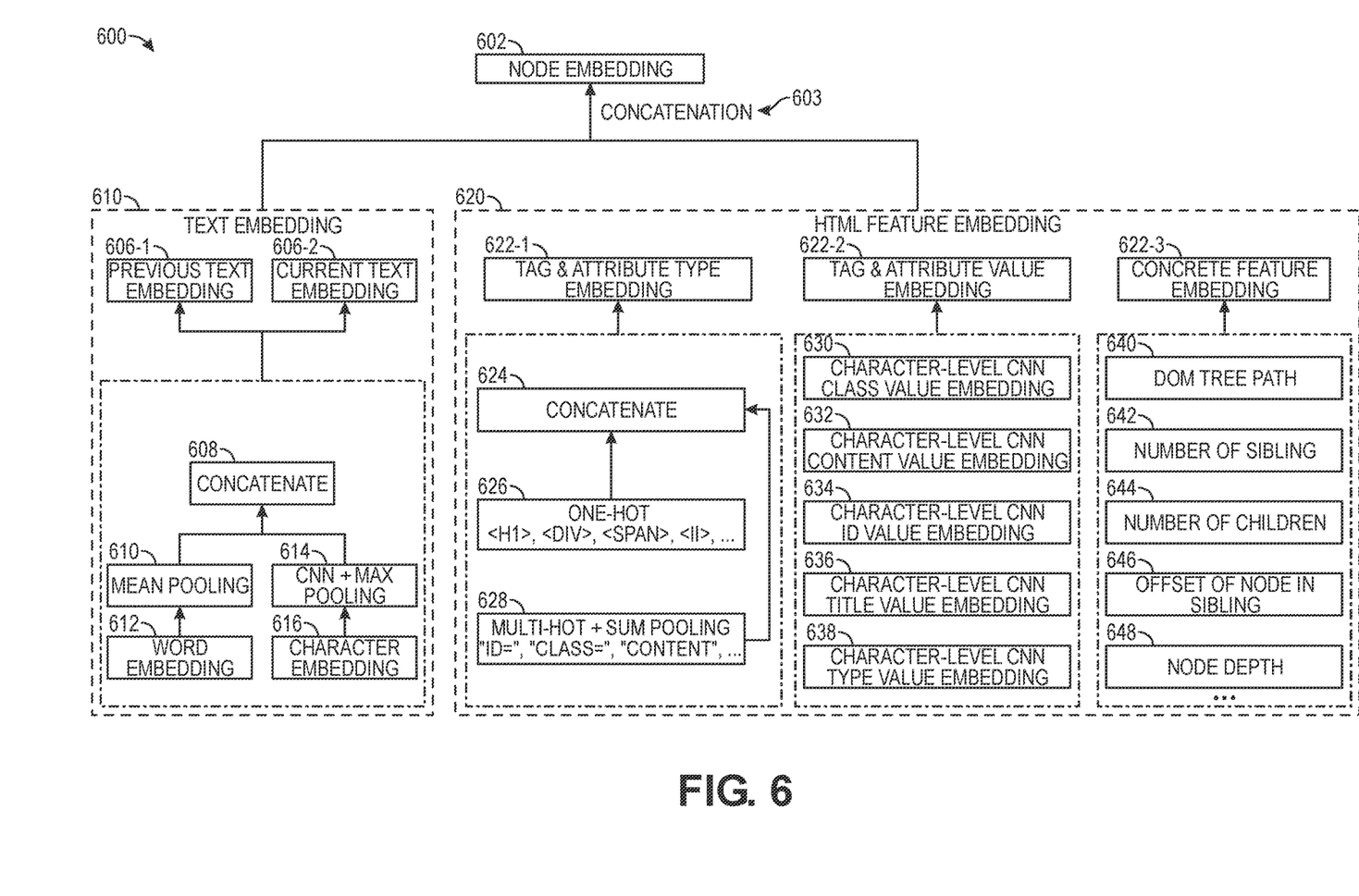
FIG. 6 is a block diagram illustrating the generation of a node embedding vector, in accordance with the disclosed implementations.

FIG. 6 is a block diagram 600 illustrating the generation of a node embedding vector 602, in accordance with the disclosed implementations.

A node embedding vector 602 of a page, as discussed herein in accordance with the disclosed implementations, may be generated from a concatenation 603 of a text embedding vector 610 corresponding to the node and an HTML feature embedding vector 620 corresponding to the node.

Turning first to the text embedding vector 610 portion of the node embedding, mean pooling 610 (or average pooling) may be utilized to generate a word embedding 612 based on the text values associated with a node and a character-level Convolutional Neural Network ("CNN") embedding and/or max pooling 614 may be used to generate a character embedding 616 for the text of the node. The word embedding and character embedding for the node may be concatenated 608 to produce the text embeddings 610 portion of the node embedding 602.

In some implementations, generating of a word embedding and character embedding may be performed on only the text of the current node to produce a current text embedding vector 606-2. In other implementations, a word embedding and character embedding may be generated for both the text of the current node and the text of a previous node. In such implementations, the word embedding and the text embedding may be concatenated to produce a current text embedding vector 606-2 and the word embedding and character embedding for the previous node may be combined to produce a previous text embedding vector 606-1. Still further, the current text embedding vector 606-2 and the previous text embedding vector 606-1 may be combined or concatenated to produce the text embedding 610 portion that is used to form the node embedding 602 for the node.

A previous node, as used herein, refers to a node of the page that precedes the current node, (e.g., just to the left of the current node, just above the current node, just below the current node, just to the right of the current node, etc.). Alternatively, or in addition thereto, the previous node may refer to the position of nodes in the DOM tree or structure of the page. For example, a previous node may refer to a parent node, a sibling node, etc. As one example, and referring back to FIG. 2, the node 206-3 that includes the term "PRICE:" is a previous node to the node 206-4 that includes "$90."

While complex models such as Long Short-Term Memory ("LSTM") or Bidirectional Encoder Representations for Transformers ("BERT") may be utilized, in some implementations, a simple average of embeddings like fastText may be utilized as a strong baseline classification because the leading text of the node may be indicative of the node label to be assigned. Accordingly, each node text embedding may be illustrated as the function:

$$h_{TEXT} := \text{CONCAT}[\text{MEAN}(\text{word}), \text{CHAR-CNN}(\text{text seq})]$$

Turning now to the HTML feature embedding vector 620 portion of the node embedding vector 602, the HTML feature embedding vector may be formed from one or more of a tag and attribute type embedding vector 622-1, a tag and attribute type value embedding vector 622-2, and/or a concrete feature embedding vector 622-3.

A tag and attribute type embedding vector 622-1 for a node may be determined by a lookup. For example, each HTML tag of a node may be mapped to an embedding vector by a lookup structure in accordance with one of, or a concatenation 624 of, one-hot encoded data 626 and/or multi-hot encoded data and sum pooling 628. For example, a tag type embedding dictionary may be learned as part of DNN training and used to map each HTML tag to an embedding vector.

An HTML tag and attribute value embedding vector 622-2 may be generated based on one or more of a character-level CNN class value embedding 630, a character-level CNN content value embedding 632, a character-level CNN identification value embedding 634, a character-level CNN title value embedding 636, and/or a character-level CNN type value embedding 638.

For example, the HTML tag for the title on the page illustrated in FIG. 1 above may be:

<h1-class="c-pwa-product-meta-heading">Killshot 2 Leather Men's Shoe (Sale)</h1>, Wherein the CSS class value contains "heading," indicating the node attribute type is title. Accordingly, a character-level CNN with a defined filter size, such as 3 to 7, may be used to model each of one or more of the class value embedding 630, the content value embedding 632, the title value embedding 636, and/or the type value embedding 638 to form the tag and attribute value embedding 622-2. In some implementations, a raw character-level ngram may be used. In other implementations, a word-level ngram may be utilized. Accordingly, the HTML tag and attribute value embedding may be indicated as the function:

$$h_{ATTR\_VALUE} := \text{MAX-POOL}(\text{CHAR-CNN}(\text{tag attribute text}))$$

Finally, the concrete feature embeddings 622-3 may represent one or more of the DOM tree path 640 of the node, as discussed above, a number of sibling nodes 642, a number of children nodes 644, an offset of node among siblings 646, a node depth 648, etc. For example, each node in a path consists of two parts, the HTML tag and the offset of the tag among siblings. For example "div[2]" indicates that the DOM node is a "div" tag and it is the second child of its parent. LSTM may be utilized along with a lookup embedding of both the tag and the offset, as indicated by the following function:

$$h_{DOM\_PATH} := \text{LSTM}[\text{CONCAT}[\text{tag embedding,offset embedding}]]$$

As illustrated in FIG. 6, the trained DNN may determine the node embedding based on a concatenation of the text embedding vector 610 and the HTML feature embedding vector 620, as indicated by the function:

$$h(V) := \text{CONCAT}[\text{Previous Text Embedding Text Embedding,Tag Type Embedding,Tag Attribute Value Embedding,DOM Tree Path Embedding, Concrete Feature Embedding}], \quad (1)$$

Accordingly, a trained DNN may perform a similarity search between a labeled embedding vector, indicated below as $V_Q$ (for example, labeled as discussed above with respect to FIG. 2) and node of a page for which attributes are to be extracted, indicated below as $V_C$ using a ranking function: r: $V \times V \to \mathbb{R}^+$.

In addition, embeddings of neighbor nodes may be included into the ranking function r for a node to further capture page structure information:

$$r(V_Q, V_C) := r(\vec{V}_Q, \vec{V}_C) * \Sigma_{V \in \mathcal{N}(V)} r(\vec{V}'_Q, \vec{V}'_C), \quad (2)$$

where p≥1 is a hyper-parameter controlling the importance of context. p may be any value. In some examples, p may be set to unity. The neighborhood of V is defined by the union of neighbors of V:

$$\mathcal{N}(V) := \text{PARENT}(V) \cup \text{SIBLINGS}(V) \cup \text{CHILDREN}(V). \quad (3)$$

Unlike a undirected graph, different roles of neighbors are determinable from the context of DOM-tree nodes. Therefore, contributions of different types of neighbors may be distinguished when aggregated. Accordingly:

$$r(V_Q, V_C) := \cos(\vec{V}_Q, \vec{V}_C) * (\cos(\vec{V}_Q^{(p)}, \vec{V}_C^{(p)}) + \cos(\Sigma_{siblings} \vec{V}_Q^{(s)}, \Sigma_{siblings} \vec{V}_C^{(s)}) + \cos(\Sigma_{children} \vec{V}_Q^{(c)}, \Sigma_{children} \vec{V}_C^{(c)})) \quad (4)$$

where $V^{(p)} \in \text{PARENT}(V)$ is a parent node, $V^{(s)} \in \text{SIBLINGS}(V)$ denotes a sibling node, and $V^{(c)} \in \text{CHILDREN}(V)$ denotes a child node. In some implementations, SUM pooling may be used instead of MEAN pooling following a Graph Isomorphism Network ("GIN"), because it may be more powerful to encode graph topology information than a Graph Convolutional Network ("GCN"). Accordingly, in some implementations, graph information may be used with a trained DNN rather than learning a Graph Neural Network ("GNN") based node embedding, which may be used during training.

Accordingly, with the disclosed implementations, a DNN may be trained to output a labeled embedding vector V* for each attribute A of a page for which attributes are be extracted as predicted nodes O={V*, A}. As discussed above, for each attribute A of the page the following may be performed:

a depth D in the DOM tree T of the page of a node $V_Q$ may be calculated;

nodes C of the page C={$V_C$}, $\forall V_C$ with depth in [D−r, D+r] may be determined;

embeddings of $V_Q$ and $V_C \in C$ may be calculated by equation (1) above;

V*:=arg max s($V_Q$, $V_C$) may be calculated according to equation (4) above; and

O=O∪{V*}

Figure 7:
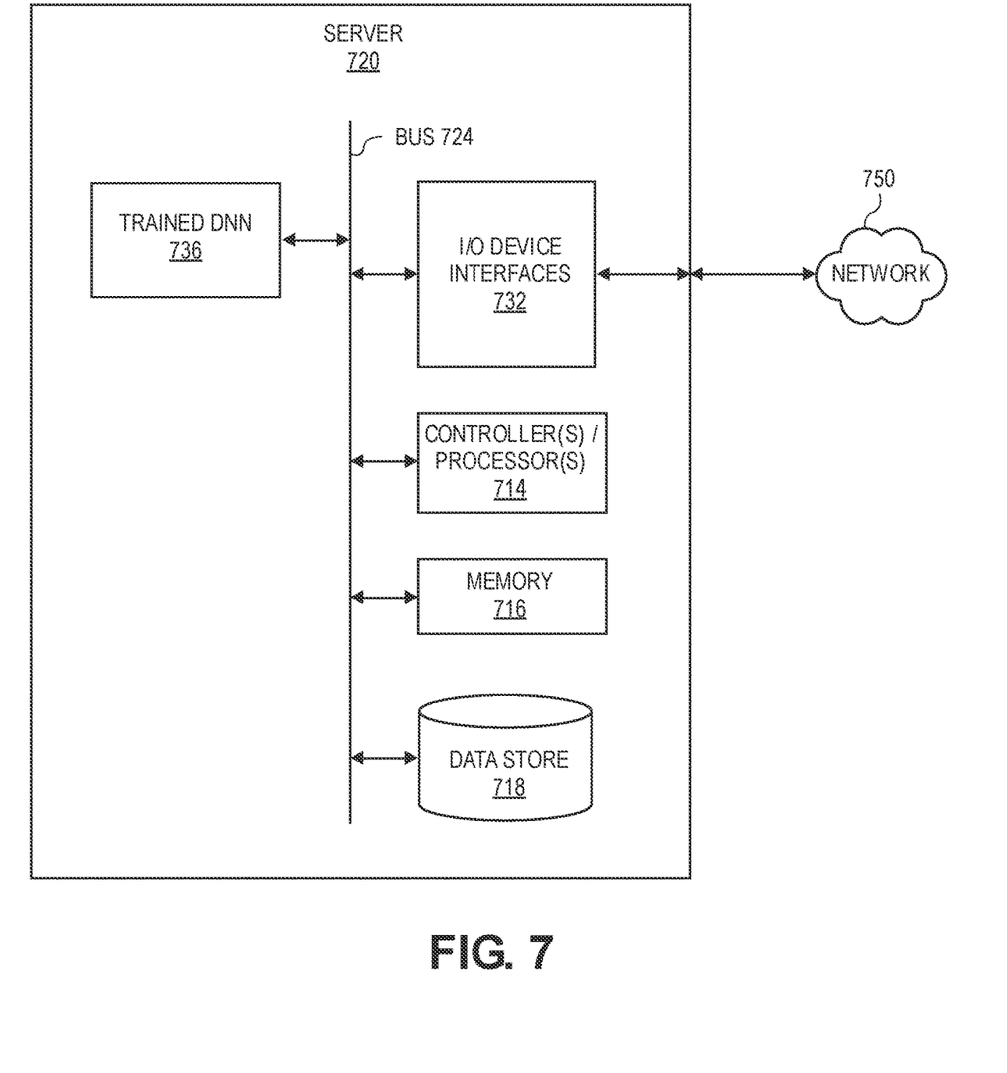
FIG. 7 illustrates example components of a server, in accordance with disclosed implementations.

FIG. 7 is a block diagram conceptually illustrating example components of a remote computing device, such as a remote server 720, that may include and/or execute one or more of the above discussed trained DNNs, in accordance with described implementations. Multiple such servers 720 may be included in the system.

Each of these server(s) 720 may include one or more controllers/processors 714, that may each include a central processing unit (CPU) for processing data and computer-readable instructions, and a memory 716 for storing data and instructions. The memory 716 may individually include volatile random access memory (RAM), non-volatile read only memory (ROM), non-volatile magnetoresistive (MRAM) and/or other types of memory. Each server may also include a data storage component 718, for storing data, controller/processor-executable instructions, training data, labels, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 750 (e.g., the Internet) through respective input/output device interfaces 732.

Computer instructions for operating each server 720 and its various components may be executed by the respective server's controller(s)/processor(s) 714, using the memory 716 as temporary "working" storage at runtime. A server's computer instructions may be stored in a non-transitory manner in non-volatile memory 716, storage 718, and/or an external device(s). Alternatively, some or all of the executable instructions may be embedded in hardware or firmware on the respective device in addition to or instead of software.

Each server 720 includes input/output device interfaces 732. A variety of components may be connected through the input/output device interfaces. Additionally, each server 720 may include an address/data bus 724 for conveying data among components of the respective server. Each component within a server 720 may also be directly connected to other components in addition to (or instead of) being connected to other components across the bus 724. Each server may also include one or more trained DNNs 736, as discussed herein.

The components of the server(s) 720, as illustrated in FIG. 7, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 3, 4, and 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   for each of a first plurality of nodes of one or more web pages of a first domain of a shopping vertical:
      generating a node embedding vector representative of the node; and
      associating a label of a plurality of labels with the node embedding vector to produce labeled data of the first domain, wherein the plurality of labels include at least one of a price label, a title label, an image label, or a description label;
   training a deep neural network ("DNN") based at least in part on the labeled data of the first domain to produce a trained DNN for the shopping vertical;
   processing a first web page of a second domain of the shopping vertical to determine a second plurality of nodes of the first web page;
   generating a plurality of node embedding vectors, each node embedding vector of the plurality of node embedding vectors representative of a node of the second plurality of nodes;
   determining, based at least in part on the trained DNN and the plurality of node embedding vectors, a label of the plurality of labels for each of the second plurality of nodes;
   extracting from each of the second plurality of nodes and based at least in part on the one or more of the labels, one or more attributes; and
   generating, based at least in part on the one or more attributes extracted from the second plurality of nodes, a second web page on a third domain, wherein:
      the second web page is distinct from the first web page;
      the second web page includes at least one of the one or more attributes extracted from the second plurality of nodes;
      the third domain is of a second vertical that is different than the shopping vertical; and
      the second web page includes a control button, that when selected, results in at least one of additional information being provided about an item corresponding to the at least one attribute included in the second web page, an ability to purchase the item, or a redirect from the second web page to the first web page.

2. The computer-implemented method of claim 1, wherein generating the node embedding vector includes:
   generating a text embedding vector corresponding to a text of the node;
   generating a hypertext markup language ("HTML") feature embedding vector corresponding to an HTML of the node; and concatenating the text embedding vector and the HTML feature embedding vector to form the node embedding vector.

3. The computer-implemented method of claim 1, wherein the trained DNN can be applied to web pages of a plurality of domains within the shopping vertical to determine labels of the plurality of labels for nodes of the web pages and enable extracting of attributes of the plurality of labels.

4. The computer-implemented method of claim 2, wherein generating the text embedding vector further includes:
generating a current text embedding vector corresponding to the text of the node;
generating a previous text embedding vector corresponding to a second text of a previous node; and
concatenating the current text embedding and the previous text embedding to form the text embedding vector.

5. The computer-implemented method of claim 2, wherein generating the HTML feature embedding vector further includes:
generating a tag and attribute type embedding vector based at least in part on a tag type of the node and an attribute type of the node;
generating a tag attribute value embedding based at least in part on a tag attribute value of the node;
generating a concrete feature embedding vector based on one or more features of the node; and
concatenating the tag and attribute embedding vector, the tag attribute value embedding vector, and the concrete feature embedding vector to form the HTML feature embedding vector.

6. A computing system, comprising:
one or more processors; and
a memory storing program instructions that, when executed by the one or more processors, cause the one or more processors to at least:
for a first web page of a first domain of a vertical:
parse code of the first web page to determine a plurality of nodes of the first web page;
determine, for each of the plurality of nodes, a corresponding visual indicator;
determine a plurality of labels corresponding to the first domain;
present a labeling interface that includes the plurality of labels and the corresponding visual indicator for each of the plurality of nodes of the first web page;
receive, in response to an interaction with the labeling interface, an assignment of a label of the plurality of labels to a first node of the plurality of nodes;
generate a node embedding vector representative of the first node; and
associate the label of the plurality of labels with the node embedding vector to produce labeled data of the first domain;
train a deep neural network ("DNN") based at least in part on the labeled data of the first domain to produce a trained DNN for the vertical;
generate a plurality of node embedding vectors, each node embedding vector of the plurality of node embedding vectors representative of a node of a second plurality of nodes corresponding to a second domain of the vertical, wherein the first domain and the second domain are independent;
determine, based at least in part on the trained DNN and the plurality of node embedding vectors, a label of the plurality of labels for each of the second plurality of nodes; and
extract, for a second node of the second plurality of nodes, one or more attributes as an attribute corresponding to the label determined for the node.

7. The computing system of claim 6, wherein the program instructions that, when executed by the one or more processors, further cause the one or more processors to at least:
process the second domain of the vertical to determine the second plurality of nodes.

8. The computing system of claim 6, wherein the program instructions that, when executed by the one or more processors to generate the node embedding vector further include instructions that, when executed by the one or more processors, further cause the one or more processors to at least:
generate a text embedding vector corresponding to a text of the second node;
generate a hypertext markup language ("HTML") feature embedding vector corresponding to an HTML of the second node; and
concatenate the text embedding vector and the HTML feature embedding vector to form the node embedding vector.

9. The computing system of claim 6, wherein the vertical is at least one of a shopping vertical, a travel vertical, a recipe vertical, a media vertical, or a services vertical.

10. The computing system of claim 6, wherein the program instructions that, when executed by the one or more processors, further cause the one or more processors to at least:
generate, based at least in part on the one or more attributes extracted for the second node, information presentable to a user accessing a third domain, wherein:
the information includes the one or more attributes; and
the third domain is independent of the second domain.

11. The computing system of claim 8, wherein the program instructions that, when executed by the one or more processors to generate the text embedding vector further include instructions that, when executed by the one or more processors, further cause the one or more processors to at least:
generate a current text embedding vector corresponding to the text of the second node;
generate a previous text embedding vector corresponding to a second text of an adjacent node; and
concatenate the current text embedding vector and the previous text embedding vector to form the text embedding vector.

12. The computing system of claim 8, wherein the program instructions that, when executed by the one or more processors to generate the HTML feature embedding vector further include instructions that, when executed by the one or more processors, further cause the one or more processors to at least:
generate a tag and attribute type embedding vector based at least in part on a tag type of the second node and an attribute type of the second node;
generate a tag attribute value embedding vector based at least in part on a tag attribute value of the second node;
generate a concrete feature embedding vector based on one or more features of the second node; and
concatenate the tag and attribute embedding vector, the tag attribute value embedding vector, and the concrete feature embedding vector to form the HTML feature embedding vector.

13. The computing system of claim 11, wherein the program instructions that, when executed by the one or more processors to generate the current text embedding vector further include instructions that, when executed by the one or more processors, further cause the one or more processors to at least:
    generate a character level embedding vector corresponding to characters included in the text of the second node;
    generate a word level embedding vector corresponding to words included in the text of the second node; and
    concatenate the character level embedding vector and the word level embedding vector to generate the current text embedding vector.

14. The computing system of claim 12, wherein the concrete feature embedding vector is generated based at least in part on one or more of:
    a number of children nodes of the second node;
    a number of sibling nodes of the second node;
    an offset between the second node and a sibling node;
    a node depth of the second node; or
    a class of an HTML attribute of the second node.

15. A method, comprising:
    generating, for a first domain, a plurality of node embedding vectors, each node embedding vector of the plurality of node embedding vectors representative of a node of a plurality of nodes corresponding to the first domain;
    determining, based at least in part on a deep neural network ("DNN") trained with data that is independent of the first domain and the plurality of node embedding vectors, a label of a plurality of labels for each of the plurality of nodes;
    extracting, for a first node of the plurality of nodes, one or more attributes; and
    generating, based at least in part on the one or more attributes extracted for the first node of the plurality of nodes, a second domain that is different than the first domain, wherein:
        the second domain includes at least one of the one or more attributes extracted for the first node;
        the second domain is of a second vertical that is different than a first vertical of the first domain; and
        the second domain includes a control button, that when selected, results in at least one of additional information being provided about an item corresponding to the at least one attribute included in the second domain, an ability to purchase the item, or a redirect from the second domain to the first domain.

16. The method of claim 15, further comprising:
    training the DNN by at least:
        generating, for each of a second plurality of nodes of a third domain, a second node embedding vector representative of the node, wherein:
            the third domain and the first domain are included in a same vertical; and
            the third domain and the first domain are independent;
        associating a label of the plurality of labels with each of the second node embedding vectors to produce labeled data of the third domain; and
        training the DNN based at least in part on the labeled data of the third domain.

17. The method of claim 15, wherein generating the plurality of node embedding vectors includes:
    for each node of the plurality of nodes:
        generating a text embedding vector corresponding to a text of the node;
        generating a hypertext markup language ("HTML") feature embedding vector corresponding to an HTML of the node; and
        concatenating the text embedding vector and the HTML feature embedding vector to form the node embedding vector.

18. The method of claim 16, wherein associating a label of the plurality of labels with the second node embedding vector includes:
    presenting a page of the third domain to a user;
    receiving, in response to presenting the page, an indication from the user of a label corresponding to a node associated with the second node embedding vector; and
    associating the label with the second node embedding vector of the node.

19. The method of claim 17, wherein generating the text embedding vector for each node of the plurality of nodes, further includes:
    for a first node of the plurality of nodes:
        generating a current word embedding for the first node based at least in part on text values associated with the first node;
        generating a previous word embedding for a previous node based at least in part on text values associated with a previous node, wherein the previous node is at least one of a node of the first domain that precedes the first node or a node of the first domain that is at least one of a parent node of the first node or a sibling node of the first node;
        concatenating the current word embedding and the previous word embedding to generate a word embedding for the first node;
        generating a current character embedding for the first node based at least in part on the text of the node;
        generating a previous character embedding for the previous node based at least in part on text values associated with the previous node;
        concatenating the current character embedding and the previous character embedding to generate a character embedding for the first node; and
        concatenating the word embedding and the character embedding to generate a first text embedding vector for the first node.

* * * * *